(No Model.) 3 Sheets—Sheet 1.
J. W. HUNTER & T. N. LAKIN.
HAY LOADER.
No. 431,585. Patented July 8, 1890.
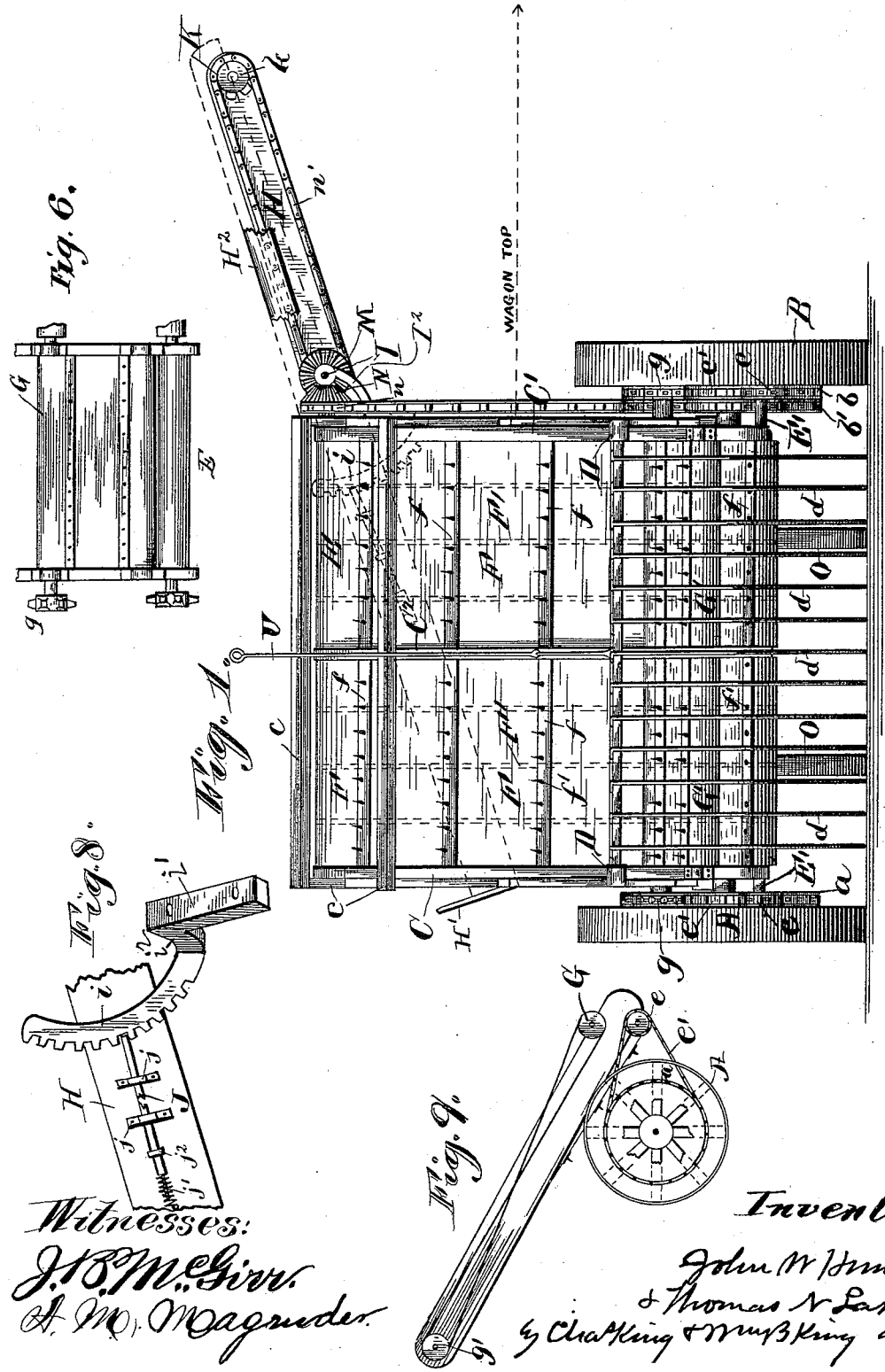

(No Model.) 3 Sheets—Sheet 2.
J. W. HUNTER & T. N. LAKIN.
HAY LOADER.
No. 431,585. Patented July 8, 1890.
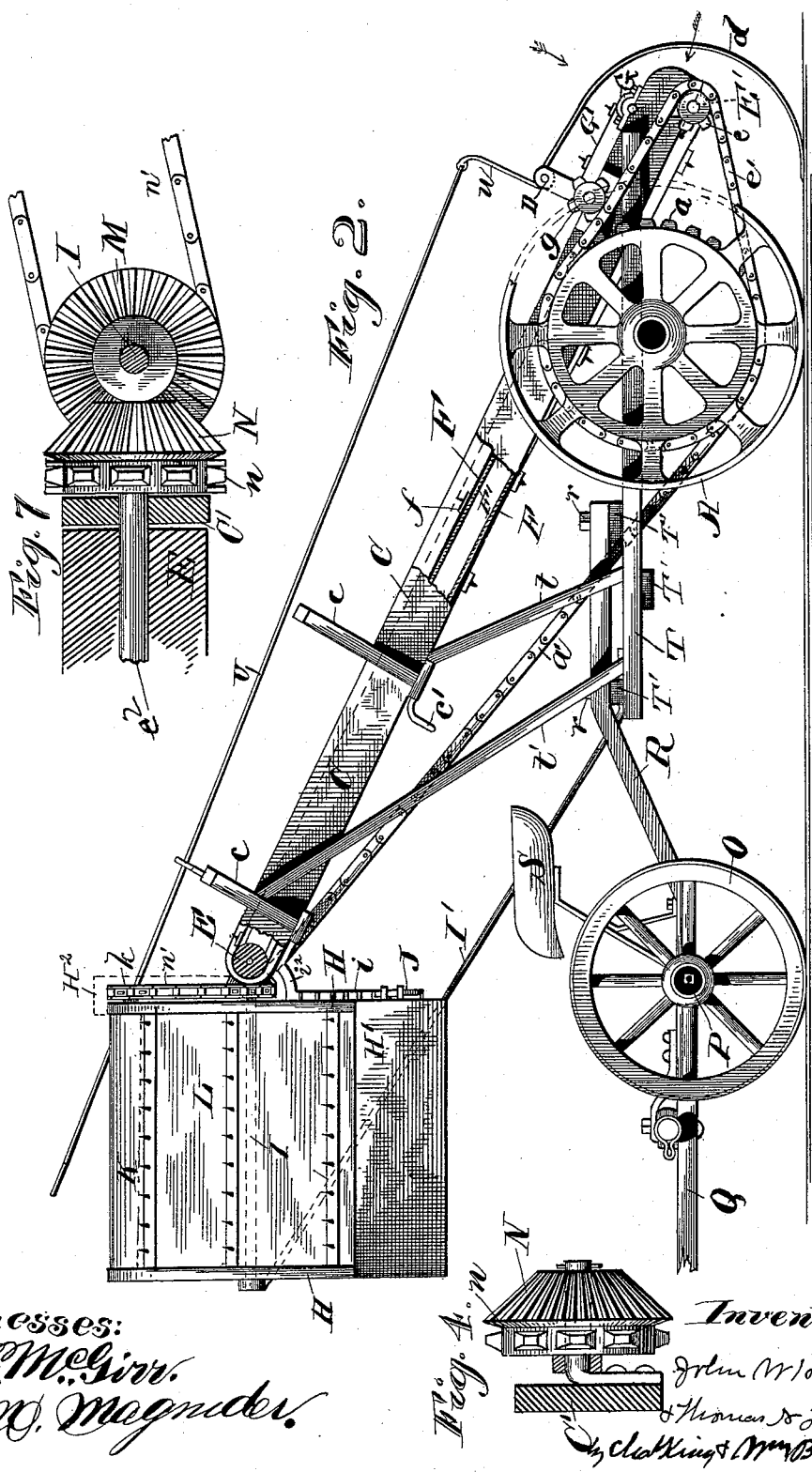

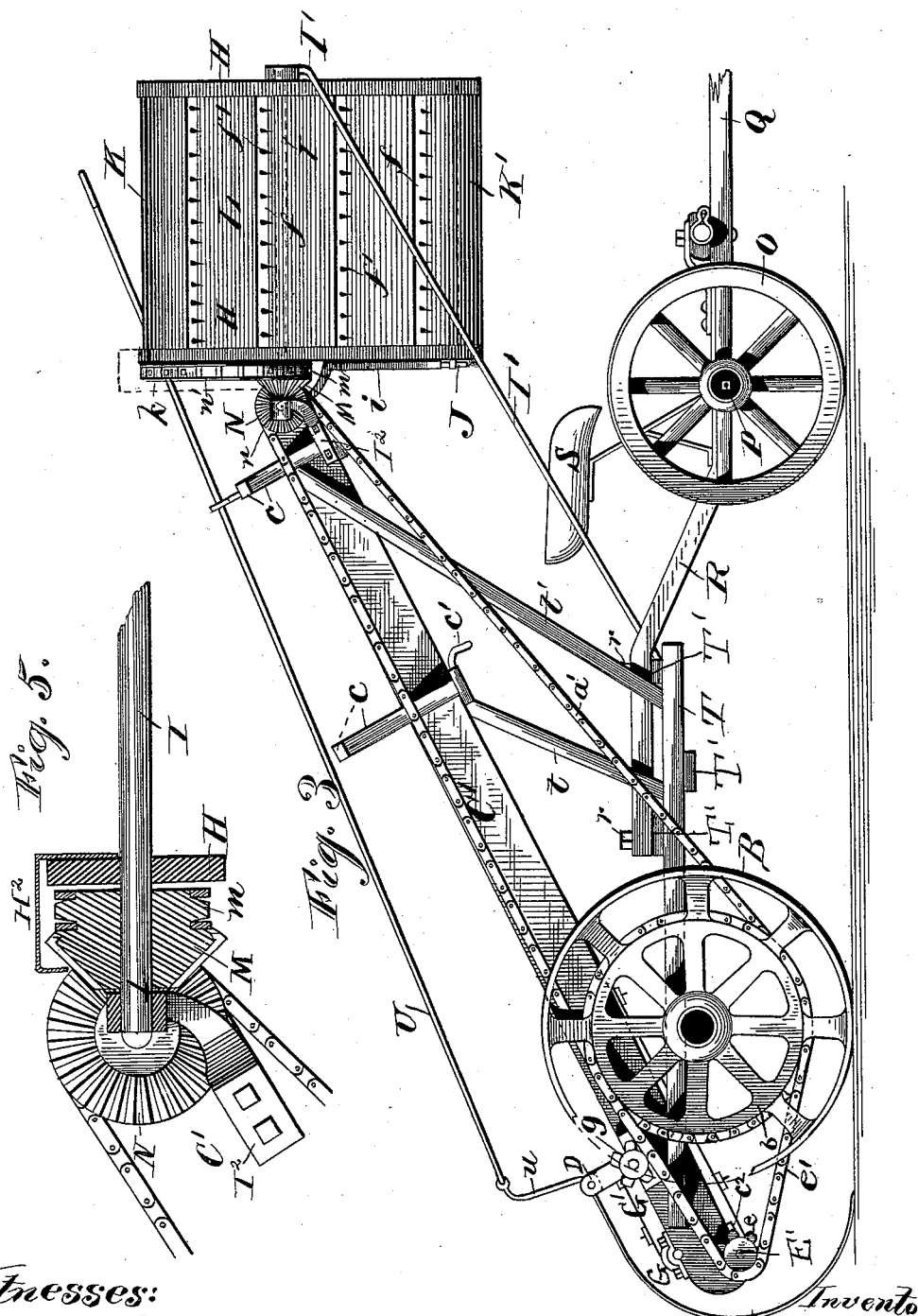

UNITED STATES PATENT OFFICE.

JOHN W. HUNTER AND THOMAS N. LAKIN, OF OWANECO, ILLINOIS.

HAY-LOADER.

SPECIFICATION forming part of Letters Patent No. 431,585, dated July 8, 1890.

Application filed December 28, 1888. Serial No. 294,879. (No model.)

*To all whom it may concern:*

Be it known that we, JOHN W. HUNTER and THOMAS N. LAKIN, citizens of the United States, residing at Owaneco, in the county of Christian and State of Illinois, have invented certain new and useful Improvements in Hay-Loaders; and we do hereby declare the following to be a full, clear, and exact description of the invention, such as will enable others skilled in the art to which it appertains to make and use the same.

Figure 1 is a rear elevation of our machine. Fig. 2 is a side elevation looking in the direction of the arrow, Fig. 1. Fig. 3 is an elevation looking in the opposite direction. Figs. 4, 5, 6, 7, and 8 are details, some of these figures being enlarged. Fig. 9 illustrates a modification of part of the driving mechanism.

A B are the main driving and supporting wheels, provided with sprocket-wheels $a$ on A and $b$ and $b'$ on B.

We propose to employ an inclined rectangular elevator-frame having side pieces C C' connected with each other by suitable cross-pieces, and having posts and girts $c\ c$, which need not be described in detail, frames of this sort being in common use in hay-loaders, except that we propose to use a similar center strip or rail $C^2$, supported about midway between the side pieces. $c'\ c'$ are hooks or clamps attached to the side rails and adapted to connect this frame with the rear end of a wagon upon which it is desired to load the hay, it being understood that the size of the frame is such that these hooks will take over the rear part of the frame-work or "rigging," which is ordinarily secured to a wagon for the reception of the hay.

D is the head, and $d\ d$ the teeth, of the rake, the head being mounted on the frame-work in such position that the teeth shall operate to gather the hay as the machine is drawn along, the rake head and teeth being of any usual sort adapted for the work, and so mounted that the rake head and teeth can be tilted by a rod or link and lever, to be hereinafter described, any of the usual supports for the rake-head being employed.

At the date of this patent it has been for some time the practice in constructing machines of this class to arrange the raking or initial gathering mechanism in front of the elevators, and it will be seen that there are some features of the construction and invention herein shown which can be embodied in such machines, they being irrespective of the exact location of the said raking or gathering mechanism.

E E' are rollers mounted, respectively, at the upper and lower ends of the frame and carrying a pair of belts or webs arranged side by side, to be described. The rollers E' have their ends journaled in the side pieces and in the center strip or rail $C^2$, and are provided at their outer ends with sprocket-wheels $e\ e$.

$e'\ e'$ are driving-chains traversing the sprocket-wheels $e\ e$ and the sprocket-wheels $a\ b$. Each of these carrying-belts is composed of two lines of rubber belting F F, with two, three, or more ropes F' arranged intermediate of the length of the belts.

$f\ f$ are cross-slats, secured at their ends to the belts and also preferably to the ropes by bolts, rivets, staples, or other suitable fastening devices, and are provided with outward projecting teeth or spurs $f'$ of some suitable sort, which shall operate to carry up the hay and discharge it freely after it has passed the upper roller E; but these belts need not be specifically described, because similar belts are in common use in hay-loaders of this general character.

We propose to use a pressure device at the lower end of the belts to facilitate the delivery thereto of the hay which has been gathered by the rake, and a convenient device of this sort is indicated as consisting, essentially, of an endless belt G', mounted on rollers G G, supported in the side and center pieces, one each of two of these rollers having a sprocket-wheel $g$ driven by the chain belts $e'$. The apparatus, as above described, may be attached to and drawn by a wagon, and as it moves over the ground will collect hay and deliver it to the wagon in front of it, as will be readily understood without further explanation.

In order to adapt the machine for delivering hay to a wagon traveling by its side, we propose to make the following additions.

H H are side pieces of the frame of a tilting elevator mounted transversely to the frame, heretofore described, and at its upper end upon the pivot-bar I, which is firmly supported thereat and in a substantially horizontal plane. We prefer to attach the inner end of this pivot I to one of the side pieces by a bracket I², and to support the outer end of the pivot by a bracket I' at the outer end of the pivot. Of course the lower end of the bar I' should be secured to the main frame-work, and the lower or inner end of the bracket I² should be secured to some part of the elevator-frame by bolts or otherwise, and the tilting elevator-frame is mounted loosely on the pivot-bar, so that it can vibrate about the pivot. In order to support this vibrating frame in proper position, we propose to employ a notched standard or rack $i$ $i'$ $i^2$, of which the part $i$ is substantially concentric to the pivot I, and is connected by an arm or bent part $i^2$ with a base $i$, which is bolted to side piece C'.

J is a spring-latch connected to one of the side pieces H by straps or blocks $j j$ with a spring $j'$ to keep the latch in engagement with the notched standard, the latch having a thumb-piece $j^2$, by means of which it may be conveniently drawn out of the notches.

K is an upper roller, and K' a lower roller journaled in the vibrating frame, with a belt or carrier L, of any usual or approved construction, adapted to traverse the rollers. H² is a guard carried by the frame H H to prevent material becoming entangled with a chain employed for driving the belt of this conveyer. H' is a fender carried by the lower end of the frame to prevent material from falling off at that point. To drive this belt L, we propose to use the following form of gearing.

M is a beveled gear mounted upon the pivot-bar.

N is a bevel-gear mounted on side piece C' by means of a bracket bearing in such position that it will properly mesh with the bevel-gear M.

$n$ is a sprocket-wheel, preferably cast in one and the same piece with bevel-gear N, and connected with sprocket-wheel $b'$ by a chain belt $a'$. Thus the beveled gears are always maintained in the proper working relation under the ordinary adjustments of the "tilting elevator," as we prefer to call this vibrating frame and its belt L.

$m$ is a sprocket-wheel, preferably cast in one and the same piece with the bevel-gear M, and connected by the chain belt $n'$ with a sprocket-wheel $k$ on the shaft of the upper roller K, whereby the endless belt of this tilting elevator is driven in the proper direction, and hay which is carried up by the elevator-belts from the rake-teeth will fall upon the tilting elevator and be delivered over its upper end, as will be readily understood without further explanation. Instead of the sprocket-wheel $n$ and the chain belt which drives it from sprocket-wheel $b'$, we may mount the bevel-gear N on the end of the shaft $e^2$ of the upper roller E, Fig. 7. Of course grooved pulleys and a rope—as, for instance, a tarred rope—may be substituted for the sprocket-wheels and chains to drive the pressure device, and a convenient way of driving such rope will be a grooved pulley on the outer end of the upper roller E—as, for instance, at $g'$—in which case the belt running thence to pulley $g$ should be crossed. (See Fig. 9.)

In order to support and guide the machine as thus built, we propose to use a pair of guiding and supporting wheels O O with an axle P and tongue Q, these parts being connected with the main framing T by a reach or bar R, and to accommodate a driver we propose to mount a seat S upon the axle of these wheels O O or upon the reach R.

In order to strengthen and stiffen the frame-work of the machine, we propose to use cross-girts T' T' and braces $t$ $t'$, and we propose to connect the reach R with this frame-work by bolts $r$ $r$, passing through the reach and the cross-girts T', or in any other convenient way.

We propose to employ a rod U, connected at one end to an arm or lever $u$ of the rake-head and extending forward within convenient reach of the driver when riding in the seat, so that he may lift the rake-teeth from the ground.

While we have described the best mode now known to us for carrying out our invention, we do not wish to be limited thereby, because many modifications in detail will suggest themselves to persons skilled in the art to which this machine belongs without departing from the spirit of our invention.

What we claim is—

1. In a hay raker and loader, the combination of the front-wheel frame, the rear-wheel frame detachably connected to the front-wheel frame, the elevator, the elevator-frame supported on the rear-wheel frame, and the detachable transverse carrier, all arranged substantially as set forth, whereby the rear-wheel frame and the elevator-frame may be interchangeably used either for delivering to a wagon directly in front or to one at the side, as described.

2. The combination of the front-wheel frame, the rear-wheel frame detachably secured to the front-wheel frame, the raking mechanism on the rear-wheel frame, the elevator, the elevator-frame on the rear-wheel frame, the transverse carrier detachably connected to the elevator-frame, and the hooks $c'$, or equivalent, whereby the elevator can be used for delivering to a wagon directly in front or to one at the side, substantially as set forth.

3. In a hay raker and loader, the combination of the elevator, the elevator-frame, the drive-wheels which carry said elevator, the sprocket gearing and chains which directly connect the drive-wheels to the lower elevator-rollers, the transverse carrier, the sprocket gearing and chains directly connected to the driving-roller of the transverse carrier, the sprocket-gearing secured to the upper part of the elevator-frame, the chain driven from the drive-wheel and engaging with the last said gearing, and means, substantially as described, for transmitting power from the last said gearing to that connected with the driving-roller of the transverse carrier, substantially as set forth.

4. In a hay raker and loader, the combination, with an upwardly-moving elevator and the frame therefor, of a transversely-arranged carrier and its frame supported upon a pivot situated between its ends, said transverse carrier-frame being rigid from end to end adapted to be vibrated around said pivot, substantially as set forth.

5. In a hay raker and loader, the combination of an upwardly-moving elevator, means, as described, for carrying the hay thereto, an elevator-frame, a transverse carrier having a part thereof situated in front of the elevator, and a part thereof at the side of the elevator, and a pivot for said transverse carrier secured to the elevator-frame and situated on a line between the ends of the transverse carrier, whereby both that part in front of the elevator and that part outside thereof can be adjusted around said pivot, substantially as set forth.

6. In a hay raker and loader, the combination, with the upwardly-moving elevator and the frame therefor, of a transverse carrier, a pivot therefor between the ends and extending from side to side thereof, and means for supporting said pivot on both sides of said carrier, substantially as described.

7. In a hay raker and loader, the combination of the upwardly-moving elevator, the frame therefor, the transverse carrier, the frame therefor, the pivot which connects the carrier-frame to the elevator-frame and is situated between the ends of the carrier-frame, whereby both ends of the latter are simultaneously adjusted vertically, the curved ratchet $l$ or equivalent, and the fastening J, substantially as set forth.

8. In a hay raker and loader, the combination of the upwardly-moving elevator, the frame therefor, the drive-wheels, the chains which connect the drive-wheels with the lower roller, the chain which engages with and extends from the drive-wheel up to and engages with a wheel on the axis of the upper elevator-roller, the chain engaging with the driving-roller of the transverse carrier, and the bevel-gearing or equivalent interposed between the last aforesaid chains, substantially as set forth.

9. The combination of the drive-wheels, the raking mechanism, the upwardly-moving elevator, the elevator-frame, the transverse carrier, the pivot-bar I, secured to the elevator-frame, and the brace-bar I', situated below the transverse carrier and secured to the outer end of said pivot-bar, substantially as set forth.

10. In a hay raker and loader, the combination of the drive-wheels, the raking mechanism, the elevator, the elevator-frame, the transverse carrier, the frame therefor, the pivot for said carrier situated on a line between the ends thereof, one end of said carrier being in front of the elevator and the other projecting outside thereof, chain $n'$, engaging with the driving-roller of the transverse carrier and with a wheel on the axis of the pivot, bevel-gears M and N, the sprocket-wheel which rotates wheel M, and the chain which connects said sprocket-wheel with the drive-wheel, substantially as set forth.

In testimony whereof we affix our signatures in presence of two witnesses.

JOHN W. HUNTER.
THOMAS N. LAKIN.

Witnesses:
JOHN C. HANDEL,
MONT DANFORD.